US006608425B2

(12) United States Patent
Ebara et al.

(10) Patent No.: US 6,608,425 B2
(45) Date of Patent: Aug. 19, 2003

(54) VIBRATING GYROSCOPE, ELECTRONIC DEVICE USING THE SAME, AND SELF-DIAGNOSIS METHOD FOR VIBRATING GYROSCOPE

(75) Inventors: Kazuhiro Ebara, Shiga-ken (JP); Akira Kumada, Otsu (JP); Hiroyuki Hirano, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/050,924

(22) Filed: Jan. 22, 2002

(65) Prior Publication Data

US 2002/0109432 A1 Aug. 15, 2002

(30) Foreign Application Priority Data

Jan. 29, 2001 (JP) ........................................ 2001-020438

(51) Int. Cl.[7] .............................. H01L 41/08; G01P 9/04
(52) U.S. Cl. ............................. 310/316.01; 73/504.12; 73/504.14
(58) Field of Search ................................ 310/317, 319, 310/316.01, 321, 329, 366, 330–332; 73/504.12, 504.14, 504.15, 504.16

(56) References Cited

U.S. PATENT DOCUMENTS

| 3,823,990 | A | * | 7/1974 | Gilinson, Jr. ................. 308/10 |
| 6,016,699 | A | * | 1/2000 | Kasanami et al. ....... 73/504.14 |
| 6,116,086 | A | * | 9/2000 | Fujimoto .................. 73/504.14 |
| 6,288,478 | B1 | * | 9/2001 | Ishitoko et al. ............. 310/352 |
| 6,462,825 | B1 | * | 10/2002 | Wiebesick .................. 356/475 |
| 6,467,347 | B1 | * | 10/2002 | Fujimoto .................. 73/504.12 |
| 6,477,897 | B1 | * | 11/2002 | Mori ........................ 73/504.12 |

FOREIGN PATENT DOCUMENTS

| DE | 694 07 715 T2 | 7/1998 |
| DE | 694 20 914 T2 | 1/2000 |
| DE | 695 10 850 T2 | 4/2000 |
| DE | 695 25 231 T2 | 7/2002 |
| JP | 03-159877 | 7/1991 |
| JP | 04-215017 | 8/1992 |
| JP | 05-133755 | 5/1993 |
| JP | 06-058760 | 3/1994 |
| JP | 06-207946 | 7/1994 |
| JP | 09-218040 A | 8/1997 |
| JP | 09-281138 | 10/1997 |
| JP | 11-051655 | 2/1999 |
| JP | 2000-002542 | 1/2000 |

* cited by examiner

*Primary Examiner*—Mark O. Budd
(74) *Attorney, Agent, or Firm*—Keating & Bennett, LLP

(57) ABSTRACT

A vibrating gyroscope includes a piezoelectric vibrator and a plurality of detection load-impedance elements. The resistance of one of the detection load-impedance elements is changed by a switch so that the resistance is different from that of the other one of the detection load-impedance elements, thereby making difference between the amplitude of signals input from two detection electrodes to a differential circuit and detecting the variation in a Coriolis signal. Accordingly, a self-diagnosis for the vibrating gyroscope, for example, a diagnosis of a short circuit in the detection electrodes of the vibrator can be performed.

19 Claims, 4 Drawing Sheets

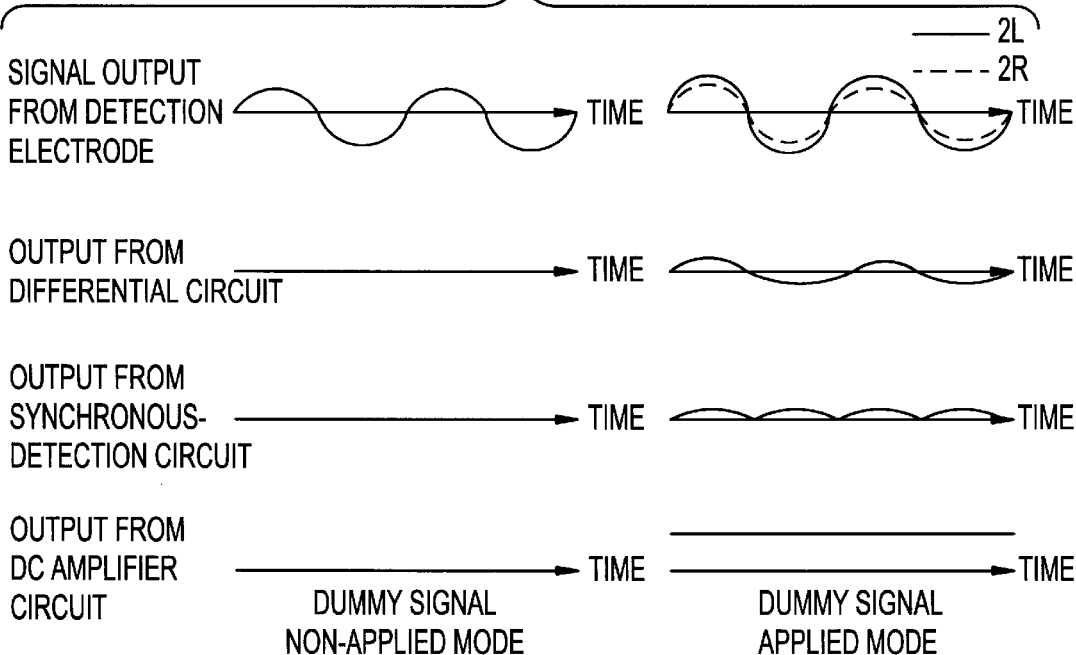
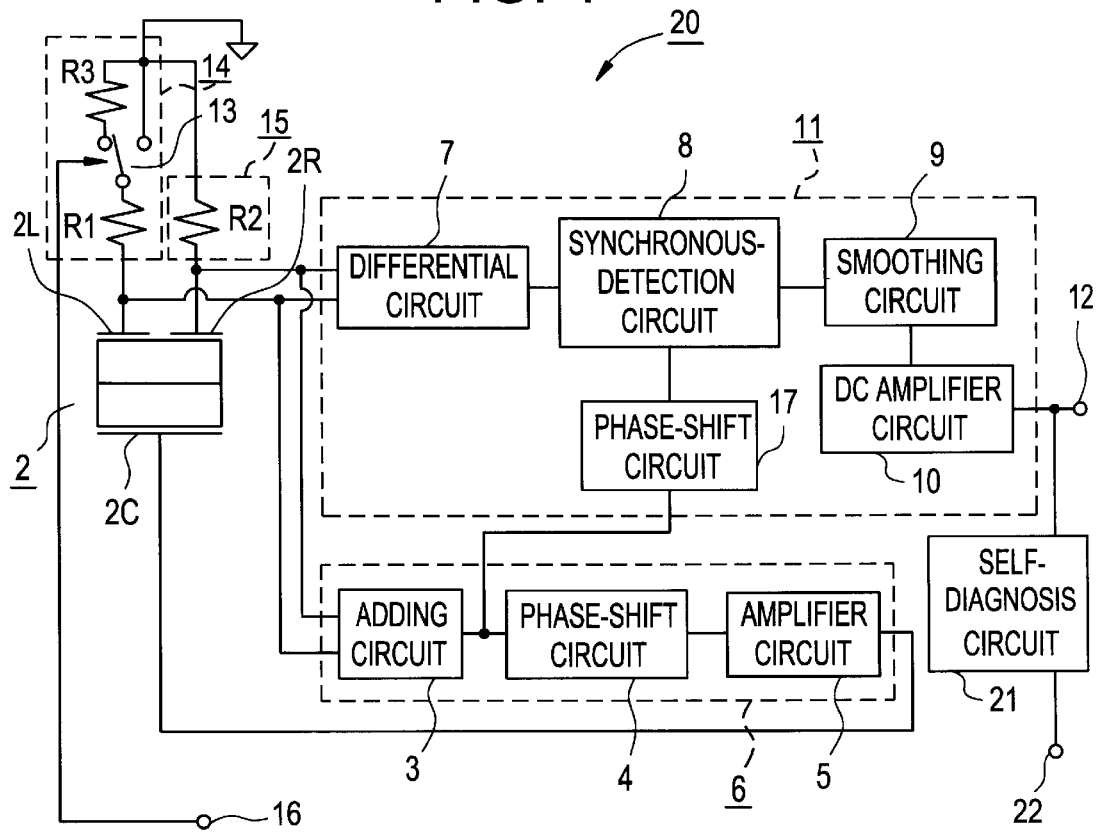

FIG. 7
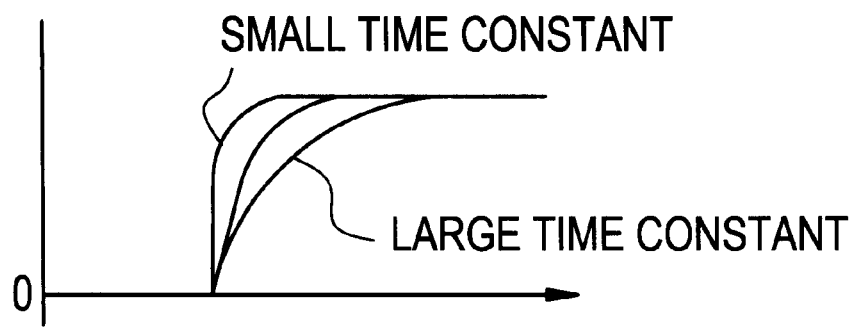
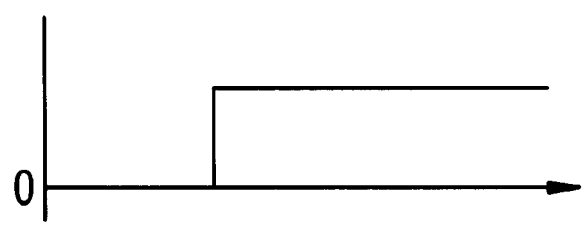

VIBRATING GYROSCOPE, ELECTRONIC DEVICE USING THE SAME, AND SELF-DIAGNOSIS METHOD FOR VIBRATING GYROSCOPE

BACKGROUND OF THE INVENTION

1. Field of the Invention

The present invention relates to a vibrating gyroscope and a self-diagnosis method for a vibrating gyroscope.

2. Description of the Related Art

A vibrating gyroscope, which is used in a safety system for controlling the attitude of a vehicle or detecting when the vehicle rolls over, a car navigation system, and other apparatuses, is required to self-diagnose malfunctions. Known devices for performing the self-diagnosis function are disclosed, for example, in Japanese Unexamined Patent Application Publication Nos. 3-159877, 4-215017, 5-133755, 6-58760, 6-207946, 9-281138, 11-51655, and 2000-2542.

The known self-diagnosis methods include (1) monitoring a driving signal and a differential output signal of a vibrator and detecting a malfunction when the level of the signals exceeds a predetermined range, and (2) monitoring an output signal by applying a signal synchronized with a synchronous-detection signal between a differential circuit and a synchronous-detection circuit and detecting a malfunction when the value of the output signal exceeds a predetermined range.

In the first method described above, however, although the vibrating gyroscope can self-diagnose whether or not a malfunction has occurred, the vibrating gyroscope cannot detect the cause of the malfunction.

In the second method described above, the signal synchronized with the synchronous-detection signal is applied after the differential circuit and thus, a malfunction in a circuit after the position to which the signal is applied can be diagnosed. However, a malfunction in the vibrator itself, for example, a short circuit or opening of a plurality of detection electrodes of the vibrator cannot be diagnosed. In addition, since this method needs many circuits and large circuits, problems with the cost and reliability result.

SUMMARY OF THE INVENTION

In order to overcome the problems described above, preferred embodiments of the present invention provide a vibrating gyroscope, which is able to self-diagnose a malfunction in a vibrator and the peripheral circuits with low-cost and greatly increased reliability, an electronic device including such a novel vibrating gyroscope, and a self-diagnosis method for a vibrating gyroscope.

According to a first preferred embodiment of the present invention, the vibrating gyroscope includes a vibrator having a plurality of detection electrodes and vibrating in response to a driving signal and an applied angular velocity, a vibrator driving unit for applying a driving signal to the vibrator, a plurality of detection load-impedance elements connected to the plurality of detection electrodes for converting charges generated in the plurality of detection electrodes due to the vibration of the vibrator to voltage signals, a Coriolis-force detecting unit for outputting a Coriolis signal corresponding to the angular velocity based on the plurality of voltage signals, and an impedance changing unit for changing the impedance of at least one of the plurality of detection load-impedance elements.

The vibrating gyroscope may further include a self-diagnosis unit for performing self-diagnosis based on the variation in the Coriolis signal caused by changing the impedance of at least one of the plurality of detection load-impedance elements.

Preferably, in the vibrating gyroscope, the self-diagnosis unit performs self-diagnosis based on a transient characteristic of the Coriolis signal caused by changing the impedance of at least one of the plurality of detection load-impedance elements.

Also, each of the detection load-impedance elements may be a resistor or other suitable component.

According to a second preferred embodiment of the present invention, a self-diagnosis method for a vibrating gyroscope including a vibrator having a plurality of detection electrodes and vibrating in response to a driving signal and an applied angular velocity, a vibrator driving unit for applying a driving signal to the vibrator, a plurality of detection load-impedance elements for converting charges generated in the plurality of detection electrodes due to the vibration of the vibrator to voltage signals, and a Coriolis-force detecting unit for outputting a Coriolis signal corresponding to the angular velocity based on the plurality of voltage signals, the method including the step of performing self-diagnosis based on the variation in the Coriolis signal caused by changing the impedance of at least one of the plurality of detection load-impedance elements.

In the method of the present preferred embodiment of the present invention, preferably, the self-diagnosis is performed based on a transient characteristic of the Coriolis signal caused by changing the impedance of at least one of the plurality of detection load-impedance elements.

Also, each of the detection load-impedance elements may be a resistor or other suitable component.

With the features described above, in the vibrating gyroscope and the self-diagnosis method according to various preferred embodiments of the present invention, malfunctions of the vibrator and the peripheral circuits can be self-diagnosed.

In addition, according to another preferred embodiment of the present invention, a much more reliable electronic device can be provided.

Other features, elements, steps, characteristics and advantages of the present invention will become more apparent from the following detailed description of preferred embodiments thereof with reference to the attached drawings.

BRIEF DESCRIPTION OF THE DRAWINGS

FIG. 3 includes waveform diagrams showing signals generated during a self-diagnosis of the vibrating gyroscope in FIG. 1;

FIG. 4 is a schematic block diagram of another preferred embodiment of the vibrating gyroscope according to the present invention;

FIG. 7 includes waveform diagrams showing a transient characteristic of the output of the low-pass filter in FIG. 6.

DETAILED DESCRIPTION OF PREFERRED EMBODIMENTS

Figure 1:
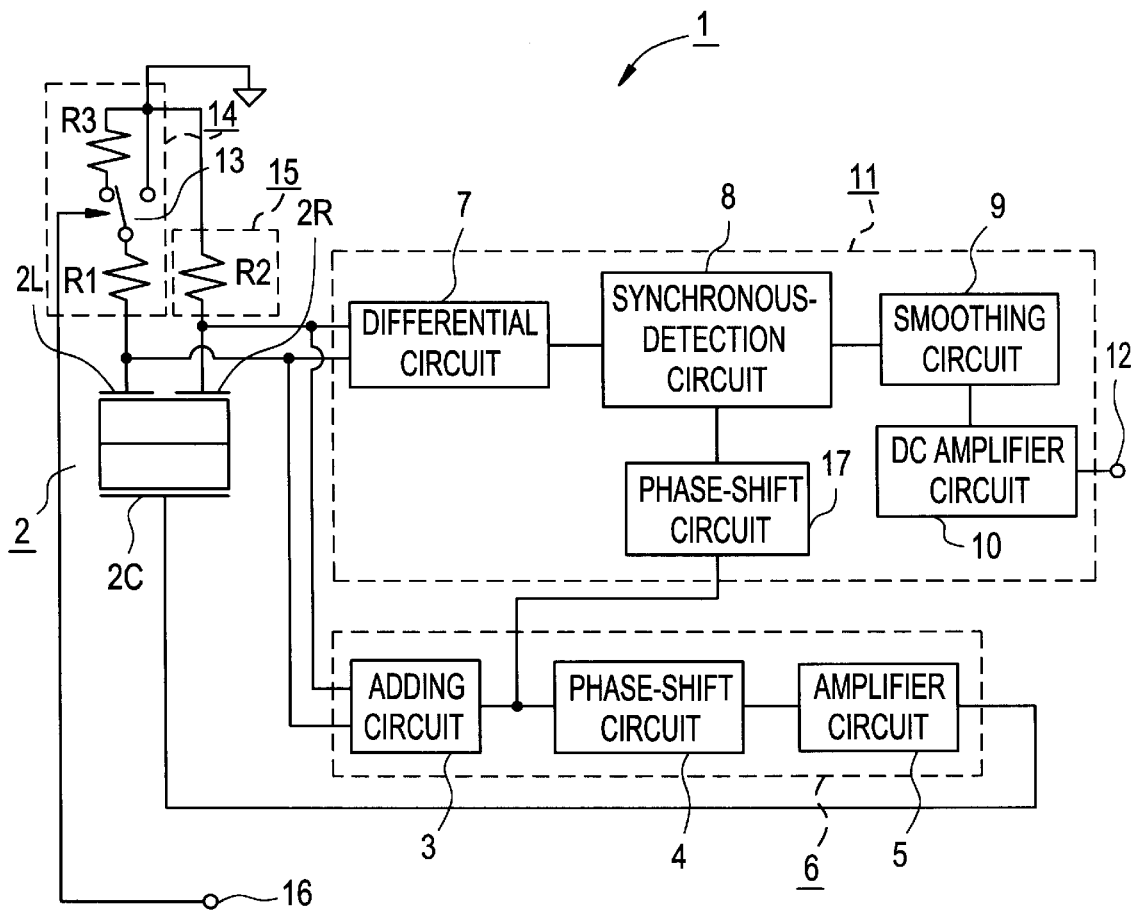
FIG. 1 is a schematic block diagram of a preferred embodiment of a vibrating gyroscope according to the present invention.

FIG. 1 is a schematic block diagram of a preferred embodiment of a vibrating gyroscope according to the present invention. As shown in FIG. 1, the vibrating gyroscope 1 preferably includes a piezoelectric vibrator 2, which is one type of vibrator that is preferably used but other types of vibrators could also be used, resistors R1, R2, and R3, an adding circuit 3, phase-shift circuits 4 and 17, an amplifier circuit 5, a differential circuit 7, a synchronous-detection circuit 8, a smoothing circuit 9, a DC amplifier circuit 10, and a switch 13.

Figure 2:
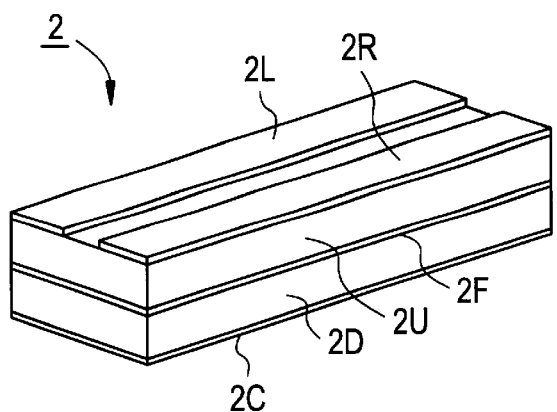
FIG. 2 is a perspective view showing a piezoelectric vibrator of the vibrating gyroscope in FIG. 1.

FIG. 2 shows the configuration of the piezoelectric vibrator 2. The piezoelectric vibrator 2 preferably includes a piezoelectric substrate 2U polarized in the thickness direction and having a principal surface on which detection electrodes 2L and 2R are provided and a piezoelectric substrate 2D polarized in the thickness direction and having a principal surface on which a common electrode 2C is provided. These piezoelectric substrates 2U and 2D are bonded at the other principal surfaces thereof via an intermediate electrode 2F.

Referring back to FIG. 1, the detection electrode 2L of the piezoelectric vibrator 2 is connected to a common terminal of the switch 13 via the resistor R1. One of the switching terminals of the switch 13 is directly connected to a reference potential and the other one of the switching terminals is connected to the reference potential via the resistor R3. The detection electrode 2R of the piezoelectric vibrator 2 is connected to the reference potential via the resistor R2. The resistors R1 and R3 and the switch 13 constitute a detection load-impedance element 14. Also, the resistor R2 alone constitutes a detection load-impedance element 15. The two detection electrodes 2L and 2R are connected to the adding circuit 3 and the output thereof is connected to the common electrode 2C of the piezoelectric vibrator 2 via the phase-shift circuit 4 and the amplifier circuit 5. Also, the two detection electrodes 2L and 2R are connected to the differential circuit 7 and the output thereof is connected to an output terminal 12 via the synchronous-detection circuit 8, the smoothing circuit 9, and the DC amplifier circuit 10. The output of the adding circuit 3 is also connected to the synchronous-detection circuit 8 via the phase-shift circuit 17. A control signal input terminal 16 is connected to a control terminal of the switch 13.

In the vibrating gyroscope 1 having the unique construction described above, a charge generated in the two detection electrodes 2L and 2R is converted to a voltage by the detection load-impedance elements 14 and 15, the voltage is input to and added in the adding circuit 3, the phase thereof is adjusted in the phase-shift circuit 4, the voltage is amplified in the amplifier circuit 5, and is applied to the common electrode 2C. Accordingly, the piezoelectric vibrator 2 is driven by self-oscillation, with a bending vibration in the thickness direction (the thickness direction of the piezoelectric substrates 2U and 2D). Consequently, the adding circuit 3, the phase-shift circuit 4, and the amplifier circuit 5 constitute a piezoelectric vibrator driving unit 6. Since the common terminal of the switch 13 is normally connected to one of the switching terminals, the resistance of the detection load-impedance element 14 is substantially equal to that of the resistor R1. Also, as described above, the resistance of the resistor R1 is preferably substantially equal to that of the resistor R2. Accordingly, the resistance of the detection load-impedance element 14 is preferably substantially equal to that of the detection load-impedance element 15 and there is no difference between the signals generated in the two detection electrodes 2L and 2R until the resistance of the detection load-impedance element 14 is changed and until an angular velocity is applied. Hereinafter, "the signal generated in the detection electrode" means "the signal obtained by converting the charge generated in the detection electrode to a voltage in the detection load-impedance element."

When an angular velocity having a rotation axis that is the axis that is substantially parallel to the longitudinal direction of the piezoelectric vibrator 2 is applied to the piezoelectric vibrator 2, which vibrates by bending in the thickness direction of the vibrating gyroscope 1, the piezoelectric vibrator 2 vibrates by bending also in the width direction (the width direction of the piezoelectric substrates 2U and 2D) due to the Coriolis force. Accordingly, the signals generated in the two detection electrodes 2L and 2R change in opposite directions with respect to each other in accordance with the Coriolis force.

The signals generated in the two detection electrodes 2L and 2R are input to the differential circuit 7 and a differential signal is output. The differential signal corresponds to the Coriolis force. The differential signal is synchronously detected in the synchronous-detection circuit 8 by a synchronization signal input from the phase-shift circuit 17, smoothed in the smoothing circuit 9, amplified in the DC amplifier circuit 10, and output from the output terminal 12. Consequently, the phase-shift circuit 17, the differential circuit 7, the synchronous-detection circuit 8, the smoothing circuit 9, and the DC amplifier circuit 10 constitute a Coriolis-force detecting unit 11. Herein, the signal output from the output terminal 12 is called a Coriolis signal.

In the vibrating gyroscope 1, when no angular velocity is applied, the resistance of the detection load-impedance element 14 connected to the detection electrode 2L varies by causing the switching terminal connected to the common terminal of the switch 13 to switch from one position to the other in response to a control signal input from the control signal input terminal 16. More specifically, the value of the detection load-impedance element 14 connected to the detection electrode 2L is changed from the resistance of the resistor R1 alone, to the total resistance of the resistors R1 and R3. On the other hand, since the resistance of the detection load-impedance element 15 is substantially equal to that of the resistor R2 and does not change, there is a difference between the resistances of the two detection load-impedance elements 14 and 15. As a result, there is also a difference in amplitude of the signals input from the detection electrodes 2L and 2R to the differential circuit 7.

The variation in the amplitude of the signals input from the detection electrodes 2L and 2R to the differential circuit 7 before and after the resistance of the detection load-impedance element 14 is changed is described with reference to FIG. 3.

Before the resistance of the detection load-impedance element 14 is changed and when no angular velocity is applied, the signals input from the detection electrodes 2L and 2R to the differential circuit 7 form sine waves having substantially equal amplitude as shown at the left portion in FIG. 3 because the signals correspond to the bending vibration in the thickness direction of the piezoelectric vibrator 2. Herein, the signal input from the detection electrode 2L to the differential circuit 7 is shown by a solid line and the signal input from the detection electrode 2R to the differential circuit 7 is shown by a broken line. However, these lines overlap each other and appear as a solid line. In this state, the output from the differential circuit 7 is zero because the two signals are coincident. Accordingly, the output from the synchronous-detection circuit 8 and the output from the DC amplifier circuit 10 are also zero.

When the switch 13 is switched in response to the control signal input from the control signal input terminal 16 and the common terminal is connected to the other switching terminal, the resistance of the detection load-impedance element 14 is changed. When the resistance of the detection load-impedance element 14 is changed, as shown at the right portion in FIG. 3, the amplitude of the signal (shown by a solid line) input from the detection electrode 2L to the differential circuit 7 varies according to the variation in the resistance. On the other hand, the signal (shown by a broken line) input from the detection electrode 2R to the differential circuit 7 does not vary. Accordingly, the signal corresponding to the difference, that is, the sine wave signal having an amplitude corresponding to the difference in the detection load-impedance elements is output from the differential circuit 7. This signal is synchronously detected in the synchronous-detection circuit 8, smoothed in the smoothing circuit 9, amplified in the DC amplifier circuit 10, and output as a Coriolis signal at the output terminal 12.

The Coriolis signal, which is output at the output terminal 12 by changing the resistance of the detection load-impedance element 14 of the detection electrode 2L, varies in accordance with the variation in the resistance. This variation, however, can be estimated in advance or measured based on the resistance of the resistor R1 or R3 and so forth. Therefore, the vibrating gyroscope 1 can perform self-diagnosis to determine whether it is operating normally by determining whether the magnitude of the Coriolis signal varies in a predetermined range by using a suitable circuit connected to the output terminal 12.

For example, when the magnitude of the Coriolis signal is higher or lower than a predetermined value when the resistance of the detection load-impedance element 14 of the detection electrode 2L is changed, it is determined that the Coriolis-force detecting unit 11 has experienced a malfunction.

When the two detection electrodes 2L and 2R are short-circuited, the detection load-impedance elements of the two detection electrodes 2L and 2R are coincident, whereby the Coriolis signal does not vary. In this way, the vibrating gyroscope 1 can diagnose a malfunction of the piezoelectric vibrator 2 by changing the resistance of the detection load-impedance element 14. That is, the vibrating gyroscope 1 has an excellent advantage in that it can perform self-diagnosis with a very simple configuration in which only the impedance elements and the switching unit are added.

FIG. 4 is a schematic block diagram of another preferred embodiment of the vibrating gyroscope according to the present invention. In FIG. 4, the same reference numerals are assigned to components that are identical or equivalent to those in FIG. 1, and the corresponding description is omitted to avoid repetition.

In FIG. 4, a vibrating gyroscope 20 preferably includes a self-diagnosis circuit 21 which is a self-diagnosis unit connected to the output terminal 12 of the DC amplifier circuit 10 along with the components of the vibrating gyroscope 1 shown in FIG. 1. The self-diagnosis circuit 21 has a diagnosis-result output terminal 22.

The vibrating gyroscope 20 having the unique construction described above has the self-diagnosis circuit 21 and thus, there is no need to provide a circuit for self-diagnosis outside the vibrating gyroscope 20.

Figure 5:
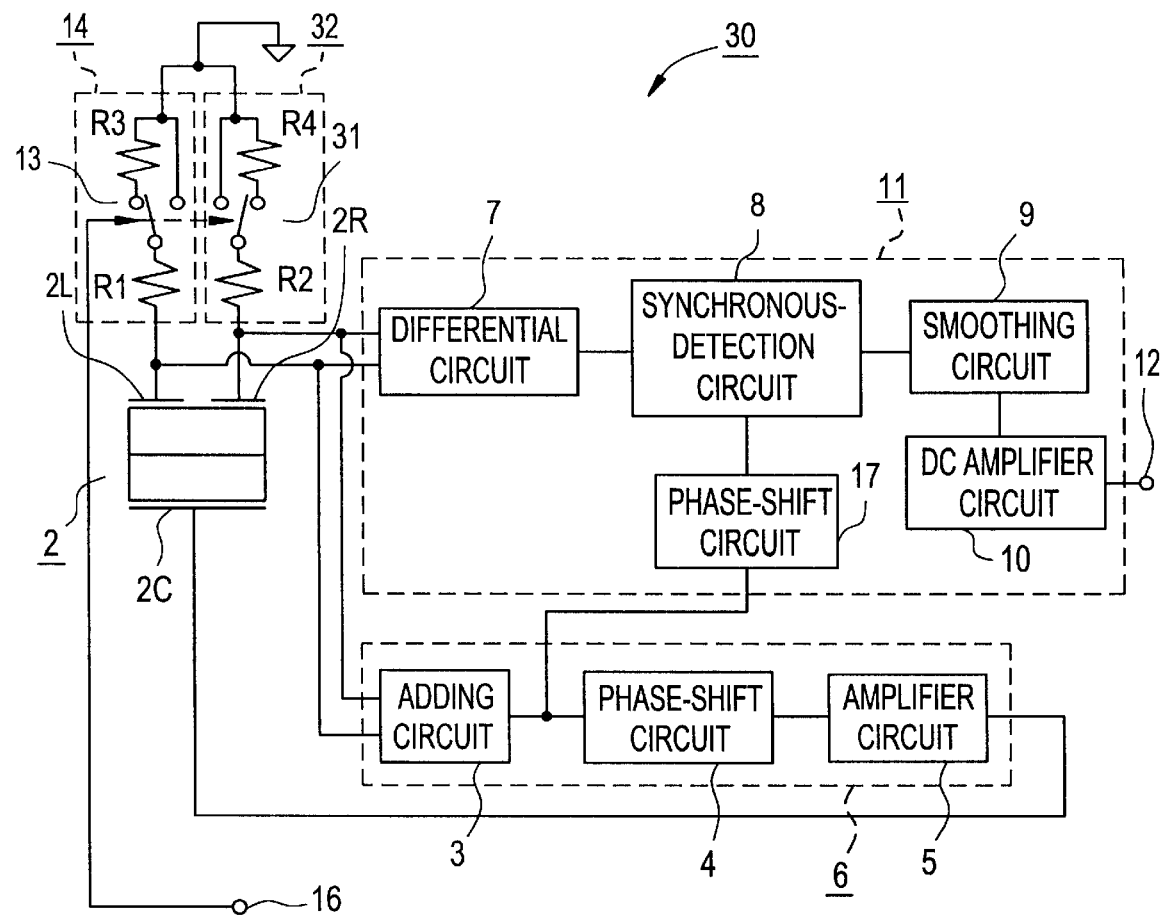
FIG. 5 is a schematic block diagram of still another preferred embodiment of the vibrating gyroscope according to the present invention.

FIG. 5 is a schematic block diagram of still another preferred embodiment of the vibrating gyroscope according to the present invention. In FIG. 5, the same reference numerals are assigned to components that are identical or equivalent to those in FIG. 1, and the corresponding description is omitted to avoid repetition.

In a vibrating gyroscope 30 shown in FIG. 5, the detection electrode 2R of the piezoelectric vibrator 2 is connected to the common terminal of a switch 31 via a resistor R2. One of the switching terminals of the switch 31 is directly connected to a reference potential and the other switching terminal is connected to the reference potential via a resistor R4. The resistors R2 and R4 and the switch 31 constitute a detection load-impedance element 32. Also, the control signal input terminal 16 is connected to the control terminal of the switch 31 as well as to the control terminal of the switch 13. The resistance of the resistor R1 is preferably substantially equal to that of the resistor R2 and the resistance of the resistor R3 differs from that of the resistor R4.

In the vibrating gyroscope 30 having the unique construction described above, since the common terminal of the switch 13 is normally connected to one of the switching terminals, the resistance of the detection load-impedance element 14 is substantially equal to that of the resistor R1. Also, since the common terminal of the switch 31 is also normally connected to one of the switching terminals, the resistance of the detection load-impedance element 32 is substantially equal to that of the resistor R2. As described above, the resistance of the resistor R1 is preferably substantially equal to that of the resistor R2, and thus, the resistance of the detection load-impedance element 14 normally coincides with that of the detection load-impedance element 32. Accordingly, no difference exists between the signals generated in the two detection electrodes 2L and 2R until the resistances of the detection load-impedance elements 14 and 32 are changed and until an angular velocity is applied.

In the vibrating gyroscope 30, when no angular velocity is applied, the resistances of the detection load-impedance elements 14 and 32 connected to the detection electrodes 2L and 2R, respectively, vary by causing the switching terminals connected to the common terminals of the switches 13 and 31 to switch from one position to the other in response to a control signal input from the control signal input terminal 16. More specifically, the value of the detection load-impedance element 14 connected to the detection electrode 2L is changed from the resistance of the resistor R1 alone to the total resistance of the resistors R1 and R3. On the other hand, the value of the detection load-impedance element 32 connected to the detection electrode 2R is changed from the resistance of the resistor R2 alone to the total resistance of the resistors R2 and R4. Although the resistance of the resistor R1 is preferably substantially equal to that of the resistor R2, the resistance of the resistor R3 differs from that of the resistor R4. Accordingly, there is a difference between the resistances of the two detection load-impedance elements 14 and 32. As a result, there is also a difference in amplitude of the signals input from the detection electrodes 2L and 2R to the differential circuit 7. Also, as in the vibrating gyroscope 1 shown in FIG. 1, the Coriolis signal corresponding to the variation in the resistance of the detection load-impedance element is output at the output terminal 12.

As described above, the resistances of a plurality of detection load-impedance elements may be also changed. In this case, the same functions and advantages as achieved by the vibrating gyroscope 1 shown in FIG. 1 can be obtained.

The method for changing the resistance of the detection load-impedance element is not limited to that using the configurations shown in FIGS. 1 and 5. Instead, any configuration can be adopted.

Further, although not shown, the vibrating gyroscope 30 shown in FIG. 5 may include a self-diagnosis circuit, like the vibrating gyroscope 20 shown in FIG. 4. In this case, the same functions and advantages achieved by the vibrating gyroscope 20 can be obtained.

In the above-described preferred embodiments, self-diagnosis for the vibrating gyroscope is performed by determining the magnitude of the Coriolis signal output from the output terminal when the value of at least one of the detection load-impedance elements is changed. However, the self-diagnosis can be performed based on a transient characteristic of the Coriolis signal in changing the impedance. The description such a method is provided below.

Figure 6:
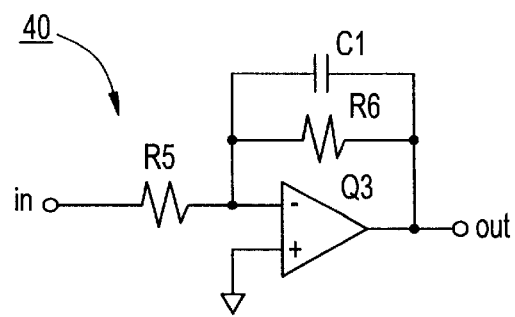
FIG. 6 is a circuit diagram showing a low-pass filter used in the vibrating gyroscope according to preferred embodiments of the present invention.

In the Coriolis-force detecting unit 11, in each of the vibrating gyroscopes 1, 20, and 30, a low-pass filter 40, as shown in FIG. 6, for attenuating high frequencies is preferably provided as an element of the smoothing circuit 9 in the subsequent stage of the synchronous-detection circuit 8.

In FIG. 6, the low-pass filter 40 preferably includes an operation amplifier Q3, a resistor R5 connected between the input terminal "in" and the inverting input terminal of the operation amplifier Q3, and a resistor R6 and a capacitor C1 both connected between the output terminal of the operation amplifier Q3 and the inverting input terminal of the operation amplifier Q3. The non-inverting input terminal of the operation amplifier Q3 is connected to the reference potential and the output terminal of the operation amplifier Q3 is connected to the output terminal "out".

In this low-pass filter 40, the signal level of the input terminal "in" is increased, for example, from 0V to a predetermined voltage in a stepwise manner when the control signal change the value of the detection load-impedance element. However, although the signal of the output terminal "out" finally reaches a certain level, it does not change in a stepwise manner and the rise time differs depending on the time constant of the resistor R6 and the capacitor C1 as shown in FIG. 7. Therefore, it can be determined as to whether the values of the resistors R5 and R6 and the capacitor C1 have changed or not by determining the rise time and the rising waveform, that is, the transient characteristic and the change in the voltage. When the output signal does not rise or is clamped by a supply voltage, it can be determined whether or not the resistors R5 or R6, or the capacitor C1 has been short-circuited or opened.

As described above, the element that experiences a change in characteristic value in a circuit of the vibrating gyroscope may be found by determining the transient characteristic of the Coriolis signal when the resistance of the detection load-impedance element is changed.

In the vibrating gyroscope of various preferred embodiments of the present invention, the vibrator preferably includes the detection load-impedance element for converting the AC charge generated in the detection electrode of the vibrator to an AC voltage. Other than this, the configuration of the vibrator is not limited. In the above-described preferred embodiments, the vibrator including a vibrating body made of a piezoelectric substance and having a plurality of detection electrodes is preferably used. However, the vibrator may be constructed by bonding a piezoelectric element having an electrode to a vibrating body made of a material other than a piezoelectric substance, such as metal. In this case, detection electrodes are provided on the surface of the piezoelectric element opposite to the surface which is bonded to the vibrating body.

The shape of the vibrator is not limited to that in each of the above-described preferred embodiments and it may be a polygonal prism such as a triangular prism, a column, or a tuning fork, or other suitable shape or configuration.

Also, the detection load-impedance element is not limited to a resistor and it may be an inductance element, a capacitance element, or a combination of such components including a resistor.

According to the vibrating gyroscope and the method for self-diagnosing the vibrating gyroscope of various preferred embodiments of the present invention, the value of at least one of the plurality of detection load-impedance elements is changed in response to the control signal and the variation in the Coriolis signal is detected at that time. Accordingly, self-diagnosis for the vibrating gyroscope can be performed at low cost and with high reliability.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A vibrating gyroscope comprising:
   a vibrator including a plurality of detection electrodes, and vibrating in response to a driving signal and an applied angular velocity;
   a vibrator driving unit for applying a driving signal to the vibrator;
   a plurality of detection load-impedance elements connected to the plurality of detection electrodes for converting charges, which are generated in the plurality of detection electrodes in response to the vibration of the vibrator, to voltage signals;
   a Coriolis-force detecting unit for outputting a Coriolis signal corresponding to the angular velocity based on the plurality of voltage signals; and
   an impedance changing unit for changing the impedance of at least one of the plurality of detection load-impedance elements.

2. The vibrating gyroscope according to claim 1, further comprising a self-diagnosis unit for performing self-diagnosis based on the variation in the Coriolis signal caused by changing the impedance of at least one of the plurality of detection load-impedance elements.

3. The vibrating gyroscope according to claim 2, wherein the self-diagnosis unit performs self-diagnosis based on a transient characteristic of the Coriolis signal caused by changing the impedance of at least one of the plurality of detection load-impedance elements.

4. The vibrating gyroscope according to claim 1, wherein each of the detection load-impedance elements is a resistor.

5. The vibrating gyroscope according to claim 1, further comprising a plurality of resistors, an adding circuit, a plurality of phase-shift circuits, an amplifier circuit, a differential circuit, a synchronous-detection circuit, a smoothing circuit, a DC amplifier circuit, and a switch.

6. The vibrating gyroscope according to claim 1, wherein the vibrator includes at least one piezoelectric substrate that is polarized in a thickness direction thereof and includes the detection electrodes disposed thereon.

7. The vibrating gyroscope according to claim 1, wherein at least one of the plurality of detection load-impedance elements includes a plurality of resistors and a switch electrically connected to each other.

8. The vibrating gyroscope according to claim 1, wherein at least one of the plurality of detection load-impedance elements comprises a single resistor.

9. The vibrating gyroscope according to claim 1, wherein the vibrator comprises a piezoelectric vibrator that is driven by self-oscillation, with a bending vibration in a thickness direction thereof.

10. The vibrating gyroscope according to claim 1, wherein the vibrator driving unit includes an adding circuit, a phase-shift circuit, and an amplifier circuit.

11. The vibrating gyroscope according to claim 1, further comprising a self-diagnosis circuit including a self-diagnosis unit connected to an output terminal of the DC amplifier circuit and the vibrating gyroscope.

12. The vibrating gyroscope according to claim 1, wherein the shape of the vibrator is one of a polygonal prism, a column, and a tuning fork.

13. The vibrating gyroscope according to claim 1, wherein each of the plurality of detection load-impedance elements comprises at least one of one of a resistor, an inductance element, and a capacitance element.

14. A self-diagnosis method for a vibrating gyroscope including a vibrator having a plurality of detection electrodes and vibrating in response to a driving signal and an applied angular velocity, a vibrator driving unit for applying a driving signal to the vibrator, a plurality of detection load-impedance elements for converting charges that are generated in the plurality of detection electrodes due to the vibration of the vibrator to voltage signals, and a Coriolis-force detecting unit for outputting a Coriolis signal corresponding to the angular velocity based on the plurality of voltage signals, the method comprising the step of performing self-diagnosis based on the variation in the Coriolis signal caused by changing the impedance of at least one of the plurality of detection load-impedance elements.

15. The method according to claim 14, wherein the self-diagnosis is performed based on a transient characteristic of the Coriolis signal caused by changing the impedance of at least one of the plurality of detection load-impedance elements.

16. The method according to claim 14, wherein each of the detection load-impedance elements is a resistor.

17. The method according to claim 14, wherein at least one of the plurality of detection load-impedance elements includes a plurality of resistors and a switch electrically connected to each other.

18. The method according to claim 14, wherein at least one of the plurality of detection load-impedance elements comprises a single resistor.

19. The method according to claim 14, wherein each of the plurality of detection load-impedance elements comprises at least one of one of a resistor, an inductance element, and a capacitance element.

* * * * *